United States Patent [19]

Mardikian

[11] Patent Number: 5,309,861
[45] Date of Patent: May 10, 1994

[54] SHOCK-ABSORBER MOUNTED SEAT FOR PERSONAL WATERCRAFT AND BOATS

[75] Inventor: Albert Mardikian, Corona Del Mar, Calif.

[73] Assignee: Mardikian 1991 Irrevocable Trust, Corona Del Mar, Calif.

[21] Appl. No.: 926,476

[22] Filed: Aug. 5, 1992

[51] Int. Cl.⁵ .............................................. B63B 29/00
[52] U.S. Cl. .................................. 114/363; 267/131; 188/109; 297/328
[58] Field of Search ............... 114/188, 191, 194, 343, 114/363; 441/129, 130; 267/195, 131–133, 217, 219, 221, 286, 291; 188/106 R, 104; 297/328, 326, 313; 248/562, 565, 567, 631

[56] References Cited

U.S. PATENT DOCUMENTS

| | | | |
|---|---|---|---|
| 4,662,597 | 5/1987 | Uecker | 267/131 |
| 4,709,649 | 12/1987 | Wann | 114/363 |
| 4,743,065 | 5/1988 | Meiller | 297/328 |
| 5,004,206 | 4/1991 | Anderson | 267/131 |
| 5,026,117 | 6/1991 | Faiks | 267/131 |
| 5,092,260 | 3/1992 | Mardikian | 114/285 |
| 5,444,299 | 9/1991 | Frank | 114/363 |

FOREIGN PATENT DOCUMENTS 2611530  9/1977  Fed. Rep. of Germany ...... 114/363

*Primary Examiner*—Robert J. Oberleitner
*Assistant Examiner*—Clifford T. Bartz
*Attorney, Agent, or Firm*—Klein & Szekeres

[57] ABSTRACT

A shock absorbing seat is provided in a personal watercraft or boat. The seat has an elongated configuration and is mounted at the front end thereof to the hull or other structural member of the watercraft for limited pivoting motion relative to the hull or structural member. A shock absorber assembly which includes a fluid filled cylinder, a piston therein, and a coil spring externally mounted to the cylinder piston combination, is mounted for limited motion relative to the hull or other structural member of the watercraft, and to the seat so as to support at least a substantial portion of the weight of the seat and occupant thereof, and to absorb forces generated between the hull and the seat while the watercraft is in motion.

12 Claims, 2 Drawing Sheets

SHOCK-ABSORBER MOUNTED SEAT FOR PERSONAL WATERCRAFT AND BOATS

BACKGROUND OF THE INVENTION

1. Field of the Invention

The present invention is directed to a personal watercraft, and particularly to a personal watercraft having a shock absorber mounted seat for the occupant. The present invention is also directed to shock absorber mounted seats usable in other type of watercrafts, such as speed boats.

2. Brief Description of the Prior Art

Personal watercraft are well known in the art. Such craft typically employs a jet pump for generating a rearwardly directed stream of water which provides the forward thrust required to propel the craft and its occupant. The direction of propulsion is controlled by the positioning of a movable steering nozzle which receives the stream of water from the pump and directs the flow so as to divide the thrust into the desired directional components. The positioning of the nozzle is affected by a steering cable system which connects the nozzle to a handlebar controlled by the driver of the watercraft. The handlebar typically includes a throttle control and an electrical on and off switch. U.S. Pat. No. 5,092,260 describes a personal watercraft which has an adjustable flap on the bottom of the craft, so that the angle at which the flap meets the water can be controlled by the operator of the craft. The flap can also serve as a brake. As far as the arrangement for accommodating the driver/occupant of the personal watercraft is concerned, one type of personal watercraft requires the occupant to stand on the watercraft while riding. This type of watercraft is also commonly known as a "jet ski". Although jet skis of this type are popular, a related sit-down type of personal watercraft has also recently gained great popularity. Such "sit-down" models include a seat which the driver usually occupies in sitting reclined or semi-prone position to drive the watercraft. It is well known that "stand-up" jet skis, as well the related "sit-down" models tend to be driven fast on the water. Therefore, the occupants of such watercraft are subjected to substantial shocks and bumps as the rapidly traveling watercraft meets the waves. In order to improve the comfort of the occupant/driver of personal watercraft, the present invention provides a shock absorbing seat for the watercraft.

SUMMARY OF THE INVENTION

It is an object of the present invention to provide a personal watercraft which allows its occupant to travel on the watercraft in increased comfort.

It is another object of the present invention to provide a personal watercraft which has a seat which allows the occupant to use the watercraft in an inclined comfortable position and which cushions the seat against shocks experienced as the craft rides on water.

It is still another object of the present invention to provide an improved seat for personal watercraft and for boats which travel fast on the water.

The foregoing and other objects and advantages are attained by a watercraft which has, in addition to an engine and drive means powered by the engine, a seat attached to a shock absorber, which is attached to the hull of the watercraft, the attachment being in such a manner that at least a substantial portion of the weight of the seat and of the occupant therein is supported by the shock absorber.

The features of the present invention can be best understood together with further objects and advantages, by reference to the following description, taken in connection with the accompanying drawings, wherein like numerals indicate like parts.

DESCRIPTION OF THE PREFERRED EMBODIMENT

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Figure 1:
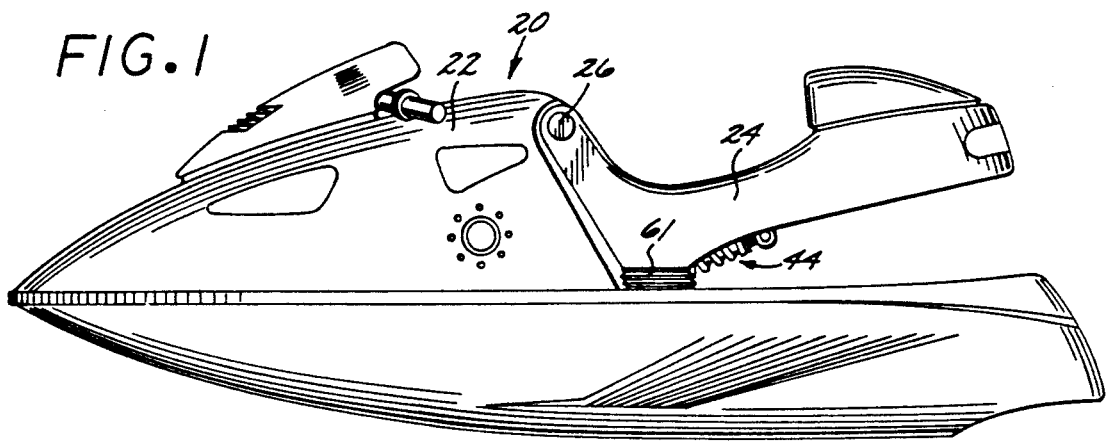
FIG. 1 is a side view showing the preferred embodiment of the present invention.

Referring now to the drawing figures, and particularly to FIG. 1, the preferred embodiment of the personal watercraft having a shock absorber mounted seat, is disclosed. It should be noted at the outset that although the shock absorber mounted seat is illustrated in connection with personal watercraft, the present invention is not so limited, because the shock-absorber mounted seat of the present invention can also be used in other types of watercraft, for example in speed boats where protecting the driver and passengers from shocks and impacts with waves is desirable. Thus, the preferred embodiment of the watercraft 20 includes a hull 22. The hull 22 is usually made in accordance with the state of the art from fiberglass. Inside the hull 22 there is a gasoline powered engine (not shown) and jet pumps (not shown) driven by the motor. The jet pumps (not shown) draw in water and direct it outward so as to propel the watercraft 20 forward. Inasmuch, as the present invention is directed to the shock absorber supported seat assembly, further description of those operating components of the watercraft which do not relate to the seat and shock absorber assembly, is not considered necessary.

Figure 2:
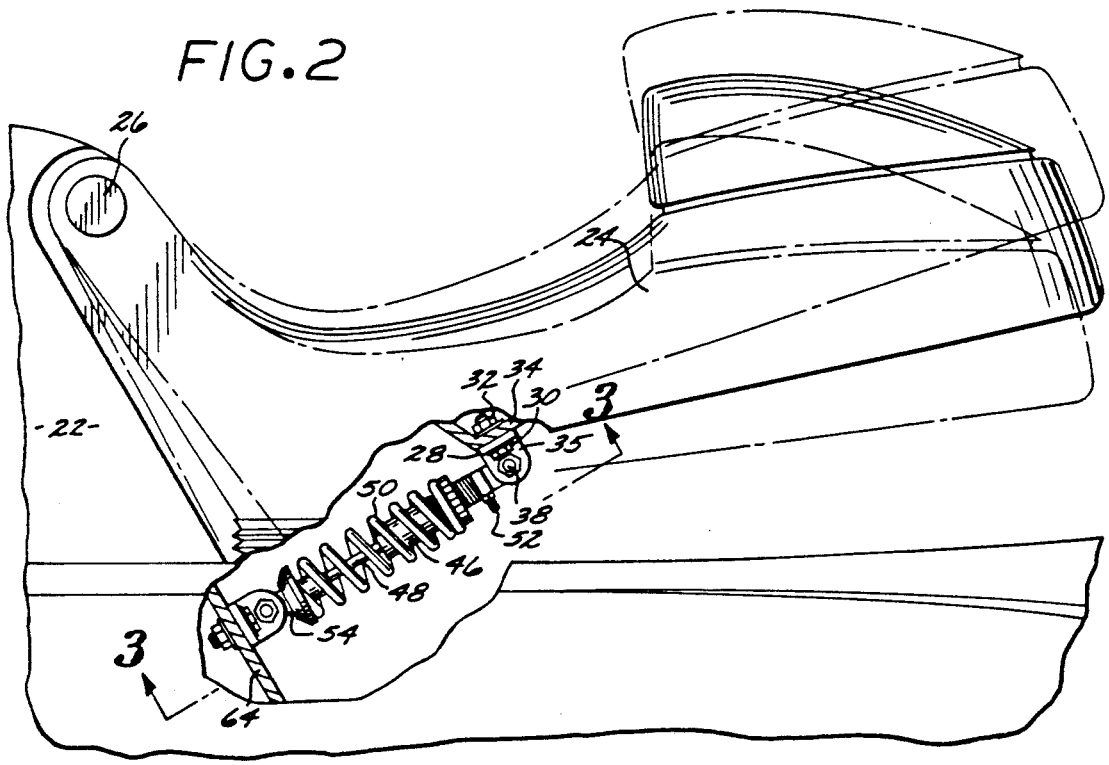
FIG. 2 is a partial side view of the preferred embodiment, with a portion of the hull of the watercraft cut away.

The seat 24 of the preferred embodiment comprises an elongated streamlined body, as shown on FIGS. 1 and 2. The seat 24, like the hull 20 is preferably made from fiberglass, although it can be made from other materials (plastics and aluminum) as well. The seat 24 is pivotably mounted to the hull substantially at the front end of the seat 24. A pivot pin 26 which is made from steel or aluminum, and which mounts the seat 24 to the hull 22 in d fashion to permit up and down motion relative to the hull 22, is shown on FIGS. 1 and 2.

Figure 3:
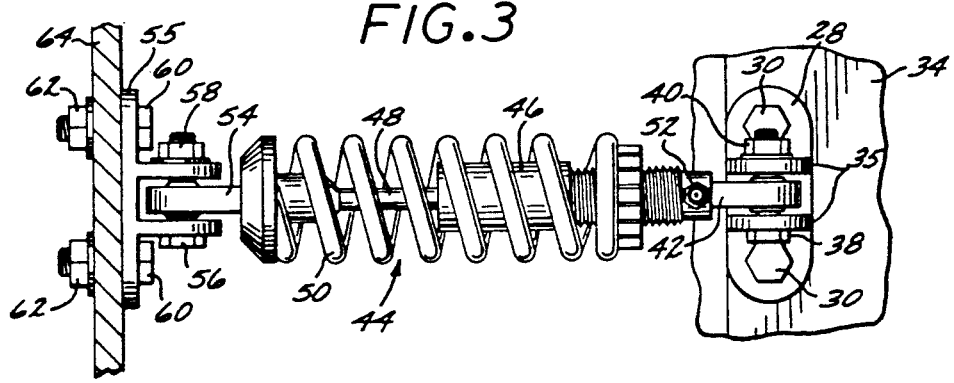
FIG. 3 is a top view of a shock absorbing assembly of the preferred embodiment of the present invention, the view taken on lines 3,3 of FIG. 2.
Figure 4:
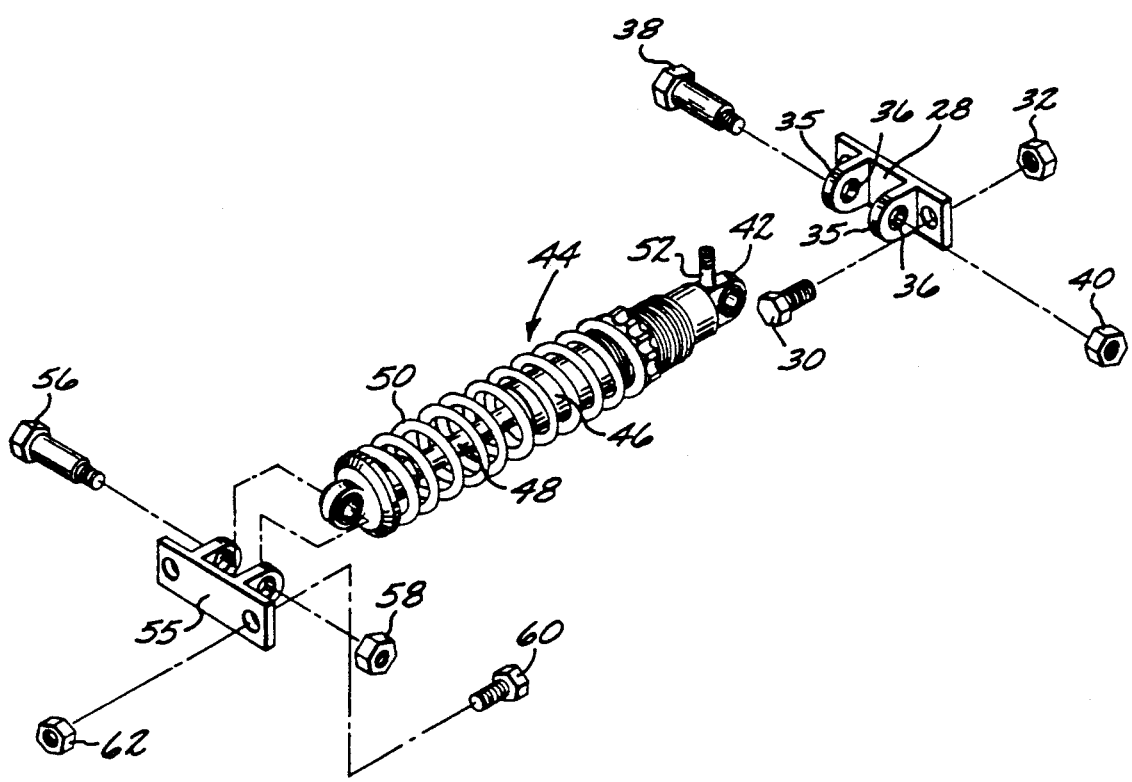
FIG. 4 is a partially exploded perspective view of the shock absorbing assembly.

Referring now primarily to FIGS. 2, 3, and 4, mounting of the seat 24 on a shock absorber assembly is disclosed. Thus, a bracket 28 is attached by bolts 30 and nuts 32 to a plate 34 in the seat 24. The plate 34 to which the bracket 28 is attached may be an integral part of the fiberglass seat 24, or it may be a steel or aluminum plate attached to the seat 24 for this purpose. The bracket 28 includes two parallel disposed ears 35, each of which has a hole 36 to receive a mounting bolt 38. The mounting bolt 38 and a matching nut 40 pivotably attaches the top part 42 of a shock absorber 44 to the mounting bracket 28. The shock absorber 44 by itself is known in the art, and therefore need not be described here in detail. In summary however, it is noted that the shock absorber 44 includes an air or liquid filled cylinder 46 and a piston which is mounted to move in the cylinder 46. The shaft 48 of the piston which protrudes from the cylinder 46 is identified with the reference numeral 48 in the drawing figures. An exterior spring 50 is also mounted on the shock absorber, to form the overall shock absorber, or shock absorbing assembly, which per se is known in the art, as noted above. Those skilled in the art will readily recognize that the shock absorbing characteristics of the above-described shock absorber assembly depend both on the characteristics of the spring 50 and of the air or liquid filled cylinder and piston combination. In fact, in the shock absorber assembly utilized in the present invention, as in the prior art as well, the shock absorbing characteristics can be varied within certain limits by adjusting the air pressure within the piston. A valved air inlet for this purpose is shown and bears the reference numeral 52. The lower portion 54 of the shock absorber, (more precisely stated of the shaft 48) which carries the piston (not shown) is pivotably mounted in a bracket 55 similar in construction to the bracket 28. A bolt 56 and a matching nut 58 mounts the lower part 54 of the shock absorber to the bracket 55. The bracket 55 is mounted by another pair of bolts 60 and matching nut 62 to a stainless steel or aluminum plate 64 which is anchored by bolts (not shown) to the fiberglass hull 20.

The shock absorber 44 is mounted relative to the seat 24 at such an angle that the shock absorber 44 is substantially aligned with the direction of movement which the cantilevered mounted seat 24 undergoes, as it oscillates relative to its resting position. This is apparent from an inspection of the drawing figures, and particularly from FIG. 2. The shock absorber which is incorporated in the preferred embodiment of the invention is obtained from Works Performance Co. of Northridge, Calif., and has capacity in the range of 100 to 400 pounds. A boot 6 made from rubber, vinyl or like material is mounted between the bottom of the seat 24 and the hull 22, in effect protecting the lower portion of the shock absorber assembly 44 from exposure to water. Another boot (not shown) which can also be made of rubber, vinyl or like material can be utilized to cover and protect from corrosion the entire shock absorber assembly.

A significant advantage of the present invention is that a person sitting in a comfortable reclined or semi-prone position on the personal watercraft 20 of the invention, is much better protected against shock and bumps while riding on the water than a person riding in prior art personal watercraft. This is because the shock absorber in combination with the cantilever mounted seat absorbs a significant portion of the shocks and bumps created during travel.

Several modifications of the present invention may become readily apparent to those skilled in the art in light of the foregoing disclosure. Therefore, the scope of the present invention should be interpreted solely from the following claims, as such claims are read in light of the disclosure.

I claim:

1. A personal watercraft of the type which accommodates its driver in a seated position, comprising a hull section, and a seat mounted to the hull in a cantilevered position by mounting means which permit movement of the seat relative to the hull, the seat being configured for accommodating a driver of the watercraft in said seated position, and shock absorber means including an enclosed fluid filled cylinder having a piston moving therein against resistance of the fluid, the shock absorber means being mounted to the hull and to the seat for being positioned between the hull and the seat with a substantially inclined longitudinal axis and for absorbing forces generated by movement of the seat relative to the hull when the personal watercraft travels on the water, the shock absorbing means being the only force absorbing means which supports the seat in a vertical direction.

2. The personal watercraft of claim 1 wherein the shock absorbing means is pivotably mounted to the bottom of the seat, and pivotably mounted to the hull.

3. The personal watercraft of claim 1 wherein seat mounting means comprises a substantially horizontally disposed pivot pin which permits substantially up and down motion of the seat relative to the hull.

4. The personal watercraft of claim 3 wherein the seat comprises an elongated member having a front end, and wherein the pivot pin is mounted substantially to the front end of the seat, whereby the seat is mounted in a cantilevered fashion.

5. The personal watercraft of claim 4 wherein the shock absorbing means further include a spring externally mounted relative to the cylinder and piston.

6. In a personal watercraft of the type which accommodates its driver in a seated position and which has a hull and an elongated seat configured to accommodate a driver of the watercraft in said seated position, the improvement comprising:

first means for mounting for limited up and down pivoting motion the elongated seat substantially at the front end thereof to the hull of the watercraft, and shock absorber means including an enclosed fluid filled cylinder having a piston moving therein against resistance of the fluid, the shock absorber means being mounted for limited relative motion to the hull and mounted for limited relative motion to the seat, for being positioned between the hull and the seat with a substantially inclined longitudinal axis and for absorbing forces generated between the seat and the hull while the watercraft is traveling on water, the shock absorbing means being the only force absorbing means which supports the seat in a vertical direction.

7. The improvement of claim 6 wherein the first means comprise a substantially horizontally disposed pivot pin mounted into the hull, the elongated seat being mounted to the pivot pin for pivoting motion about the pin.

8. The improvement of claim 7 wherein the cylinder of the shock absorber means is mounted to the seat and the piston is mounted to the hull, and wherein the shock absorber means further comprises a coil spring mounted to the exterior of the cylinder.

9. In a personal watercraft of the type which accommodates its driver in a seated semi-prone position and which has a hull and a seat configured to accommodate its driver in said seated semi-prone position, the improvement comprising:

first means for mounting a seat in a cantilevered position for limited up and down pivoting motion about a horizontal axis of pivot relative to the hull, and shock absorber means including an enclosed fluid filled cylinder having a piston moving therein against resistance of the fluid, mounted to the hull and to the seat for being positioned between the hull and the seat with a substantially inclined longitudinal axis and for absorbing forces generated between the seat and the hull while the watercraft is traveling on water, the shock absorbing means being the only force absorbing means which supports the seat in a vertical direction.

10. The improvement of claim 9 wherein the first means include a pivot pin which is substantially horizontally disposed while mounted into the hull and about which the seat can undergo the limited up and down pivoting motion.

11. The improvement of claim 9 wherein the shock absorber means further comprise a coil spring mounted externally to the piston and cylinder.

12. The improvement of claim 11 wherein a first end of the shock absorber is pivotably mounted to the hull, and a second end of the shock absorber is pivotably mounted to the seat.

* * * * *